(12) United States Patent
Stroh

(10) Patent No.: US 7,643,929 B2
(45) Date of Patent: Jan. 5, 2010

(54) METHOD FOR ADAPTING TORQUE MODEL FOR IMPROVED ZERO TORQUE IDENTIFICATION

(75) Inventor: David J. Stroh, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 71 days.

(21) Appl. No.: 11/539,952

(22) Filed: Oct. 10, 2006

(65) Prior Publication Data

US 2008/0086256 A1 Apr. 10, 2008

(51) Int. Cl.
*G06F 19/00* (2006.01)
*G06G 7/70* (2006.01)
(52) U.S. Cl. .................... 701/103; 701/110
(58) Field of Classification Search ........... 701/103, 701/102, 110, 114, 54; 123/350, 352; 477/110; 73/117.3, 118.1, 116
See application file for complete search history.

(56) References Cited

U.S. PATENT DOCUMENTS

| 5,365,903 | A | * | 11/1994 | Watanabe | 123/339.22 |
| 5,577,474 | A | * | 11/1996 | Livshiz et al. | 123/352 |
| 6,379,283 | B1 | * | 4/2002 | Cullen | 477/110 |
| 6,427,109 | B1 | * | 7/2002 | Doering et al. | 701/54 |
| 6,615,797 | B2 | * | 9/2003 | Richard et al. | 123/352 |
| 6,656,087 | B1 | * | 12/2003 | Runde et al. | 477/107 |
| 6,866,024 | B2 | * | 3/2005 | Rizzoni et al. | 701/110 |
| 7,101,310 | B2 | * | 9/2006 | Smith et al. | 477/98 |

FOREIGN PATENT DOCUMENTS

JP 5-231220 A * 9/1993
JP 2002-82020 A * 3/2002

* cited by examiner

*Primary Examiner*—Hieu T Vo

(57) ABSTRACT

A torque adaptation system is provided. The system includes: a torque error estimator module that estimates a torque error based on an error propagation model and a plurality of torque model parameters; and an adapt torque module that adapts a model torque based on the torque error.

17 Claims, 4 Drawing Sheets

METHOD FOR ADAPTING TORQUE MODEL FOR IMPROVED ZERO TORQUE IDENTIFICATION

FIELD OF THE INVENTION

The present disclosure relates to methods and systems for determining engine torque.

BACKGROUND OF THE INVENTION

The statements in this section merely provide background information related to the present disclosure and may not constitute prior art.

Torque-based control can be implemented for internal combustion engines to achieve a desired drive characteristic. An engine torque-based control system interprets an accelerator pedal position of the vehicle as an engine torque request. The engine is controlled to deliver the requested engine torque to provide the desired drive characteristic. Various torque models exist for predicting engine torque. As can be appreciated, the models are not accurate for all desired drive characteristics.

Errors in the torque models ran affect overall drivability of the vehicle. In particular, errors can affect clunk control. This is particularly true around zero torque when dunk management is active. Conventional systems account for errors in the torque model by applying conservative lash zone boundaries (torque limits bounding zero torque where rate limiting is applied) which are padded to include torque error tolerances. The consequence of this approach is degraded performance. More time is spent getting through the rate limited zone for each torque request that crosses zero thereby, sacrificing the response time of the engine. Better torque accuracy, especially around zero torque, would improve the response time by allowing the size of the lash zone to be reduced.

SUMMARY OF THE INVENTION

Accordingly, a torque adaptation system is provided. The system includes: a torque error estimator module that estimates a torque error based on an error propagation model and a plurality of torque model parameters; and an adapt torque module that adapts a model torque based on the torque error.

In other features, a method for estimating engine torque for use in controlling internal combustion engines is provided. The method includes: computing a model torque based on a torque model; determining a torque error model based on a propagation analysis of torque model parameters of the torque model; applying an adaptation method to the torque error model to determine a torque error; and computing an estimated torque based on the torque error and the model torque.

Further areas of applicability will become apparent from the description provided herein. It should be understood that the description and specific examples are intended for purposes of illustration only and are not intended to limit the scope of the present disclosure.

DRAWINGS OF THE INVENTION

The drawings described herein are for illustration purposes only and are not intended to limit the scope of the present disclosure in any way.

DETAILED DESCRIPTION OF THE INVENTION

Figure 1:
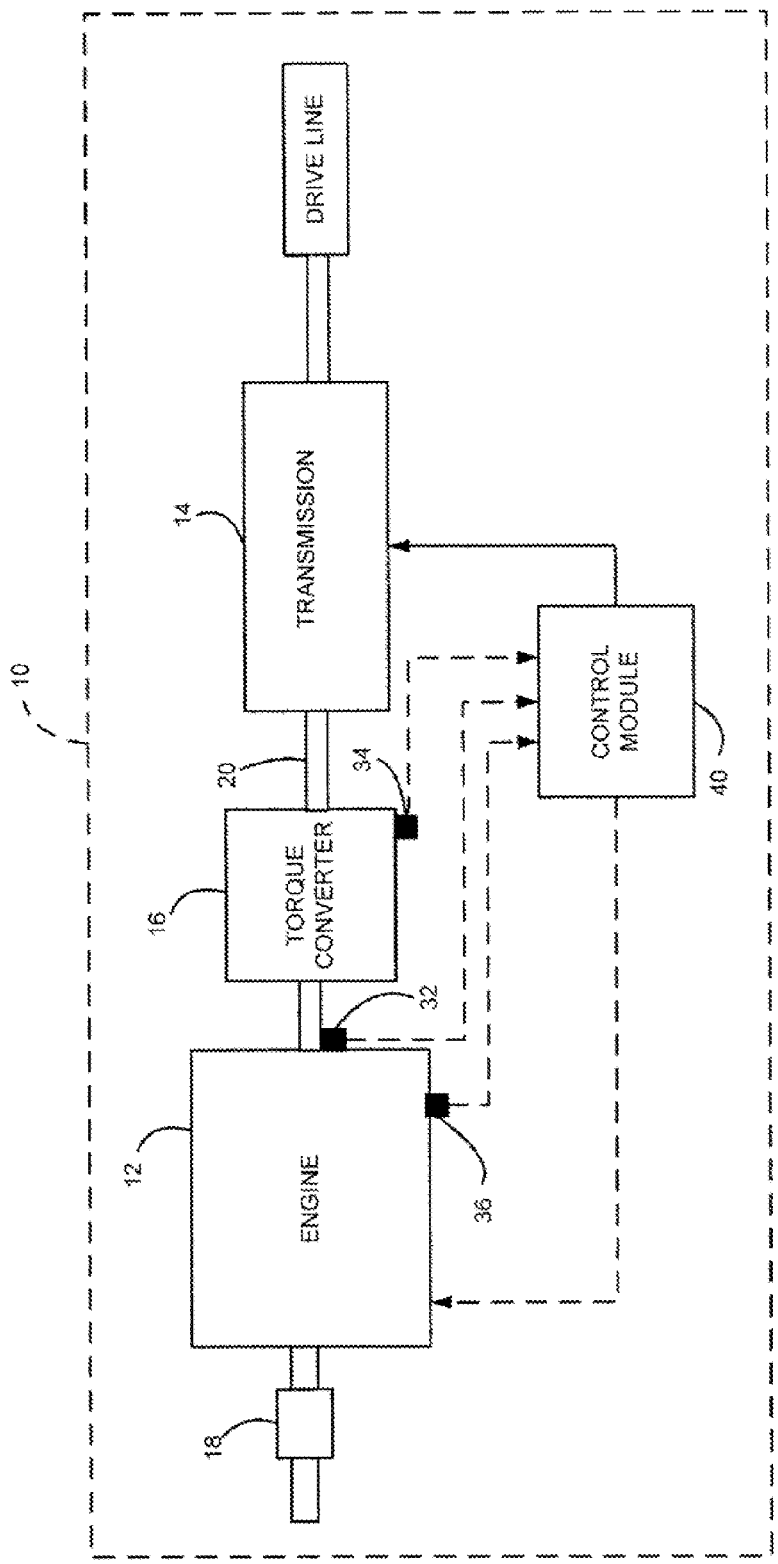
FIG. 1 is a functional block diagram of a powertrain within a vehicle.

The following description is merely exemplary in nature and is not intended to limit the present disclosure application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter (TC) 16. Air is drawn into the engine 12 through a throttle 18. The air is mixed with fuel and combusted within cylinders (not shown) of the engine 12 to produce engine torque. The torque converter 16 supplies the engine torque to the transmission via an input shaft 20.

An engine speed sensor 32 senses a rotational speed of the engine 12 and generates an engine speed signal. A turbine speed sensor 34 senses a rotational speed of a turbine in the torque converter 16 and generates a turbine speed signal. A temperature sensor 36 senses a temperature of the engine 12 and generates an engine temperature signal. The temperature sensor 36 may sense the temperature of at least one of engine coolant and engine oil. A control module 40 receives the above mentioned signals and determines an estimated engine torque value. The control module 40 controls the operation of at least one of the engine 12 and the transmission 14 based on the estimated engine torque.

Figure 2:
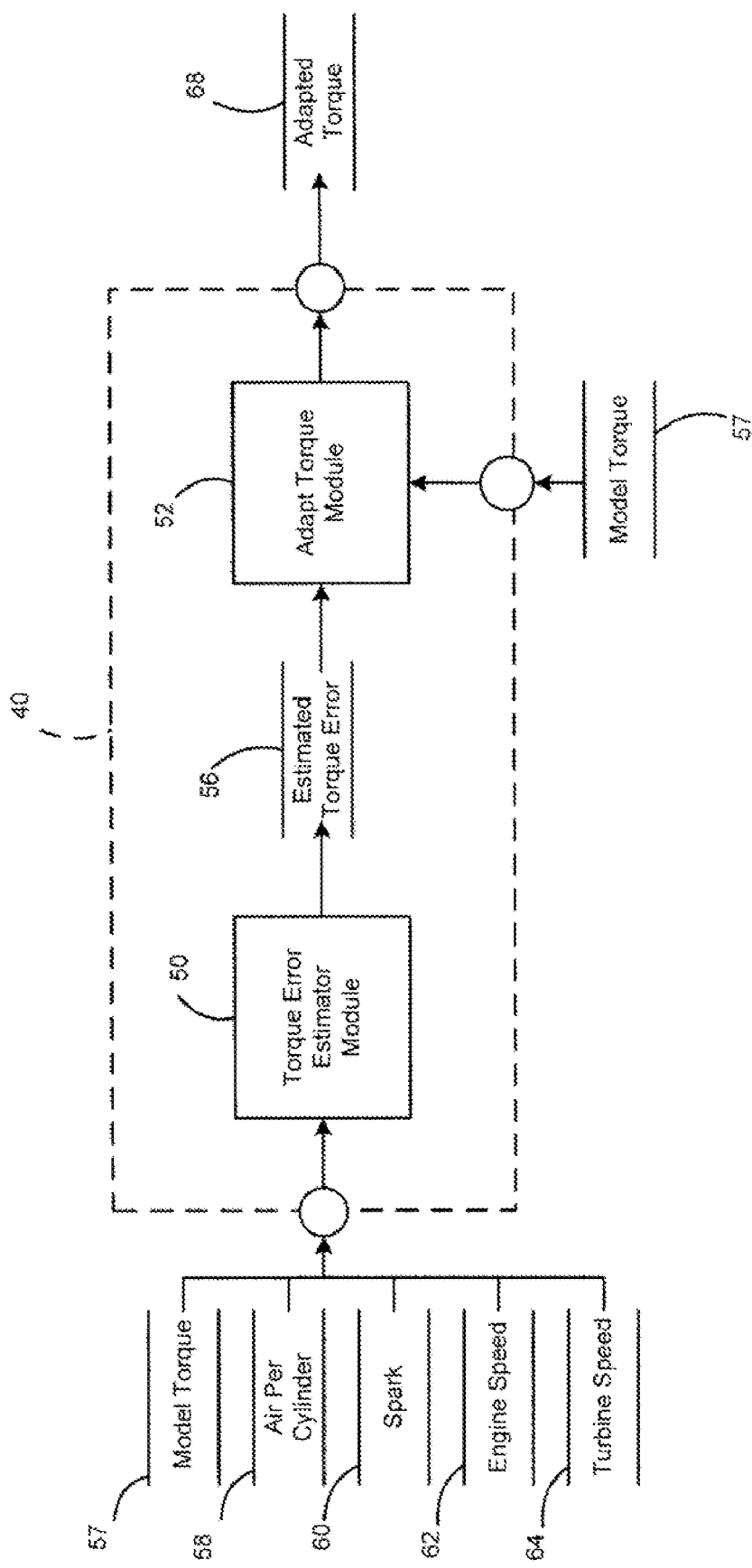
FIG. 2 is a dataflow diagram of an engine torque estimation system.

Referring now to FIG. 2, a dataflow diagram illustrates various embodiments of an engine torque estimation system that may be embedded within the control module 40. Various embodiments of torque estimation systems according to the present disclosure may include any number of sub-modules embedded within the control module 40. The sub-modules shown may be combined and/or further partitioned to similarly estimate engine torque. Inputs to the modules can be sensed from the vehicle 10, received from other control modules (not shown) within the vehicle 10, or determined from other sub-modules within the control module 40. In various embodiments, the control module 40 of FIG. 2 includes a torque error estimator module 50 and an adapt torque module 52.

The torque error estimator module 50 estimates a torque error 66 of the system using error propagation analysis on each input parameter that may influence the overall error. Error can be introduced by input parameters such as friction, accessory loads, torque model inputs (i.e. air per cylinder, spark, engine speed, temperature), and errors in the torque model itself. For ease of the discussion, the remainder of the disclosure will be discussed using torque model inputs such as air per cylinder 58, spark 60, and engine speed 62 as the input parameters. The torque error estimator module 50 employs a regression method to control the rate of adaptation of the error from each input parameter. The adapt torque module 52 receives as input the estimated torque error 66 and a model torque 57. The adapt torque module 52 adapts the model torque 57 based on the estimated torque error 66. The adapted torque 68 is output by the adapt torque module 52 for use by other modules within the control module 40.

Figure 3:
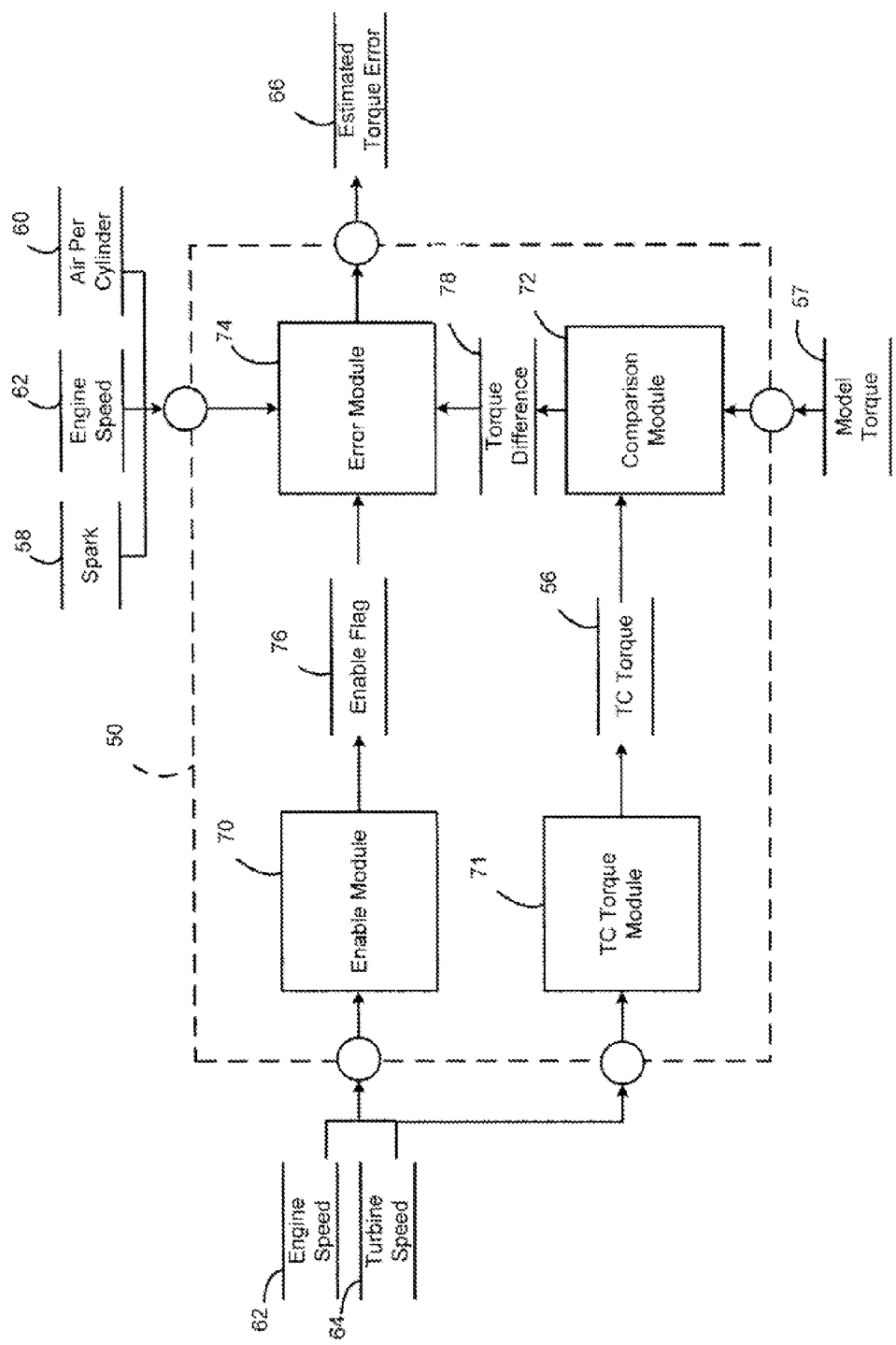
FIG. 3 is a dataflow diagram illustrating a torque error estimator module.

Referring to FIG. 3, a dataflow diagram illustrates the torque error estimator module 50 in more detail. The torque error estimator module 50 can include: an enable module 70, a torque converter (TC) torque module 71, a comparison module 72, and an error module 74. The TC torque module 71 determines a TC torque 56 based on a multi-region Kotwicki model. Teachings of the Kotwicki model can be found in SAE paper No 820393 1983. A multi-region Kotwicki model is illustrated by the following equation:

$$\text{Torque} = \alpha_1(i)\dot{\theta}^2_{pump} + \alpha_2(i)\dot{\theta}_{pump}\dot{\theta}_{turb} + \alpha_3(i)\dot{\theta}^2_{turb}. \quad (1)$$

The regions $\alpha_1(i)$, $\alpha_2(i)$, and $\alpha_3(i)$ can be defined by slip ratio where slip ratio is determined from turbine speed ($\dot{\theta}_{turb}$) and engine or pump speed ($\dot{\theta}_{pump}$) and by the following equation:

$$\text{Slip\_Ratio} = \dot{\theta}_{turb}/\dot{\theta}_{pump}, \quad (2)$$

In various embodiments, three regions can be defined where $\alpha_1(i)$ is defined by slip ratios less than 0.90; $\alpha_2(i)$ is defined by slip ratios between 0.90 and 1.03; and $\alpha_3(i)$ is defined by slip ratios greater than 1.03.

To implement the adaptation method using the Kotwicki model enabling criteria can be established to prevent adaptation in areas where the model is known to be invalid. The enable module 70 receives as input engine speed 62 and turbine speed 64, determines a slip and a slip ratio, and evaluates enable conditions based on the slip and the slip ratio. In various embodiments, enable conditions for adaptation using a multi-region Kotwicki model can be as follows; slip ratio less than 0.80; slip ratio greater than 1.08; and steady state conditions. Steady state conditions can be determined from a derivative of a delta slip.

The comparison module 72 computes a torque difference 78 based on the TC torque 56 and the model torque 57. The comparison module 72 sets the torque difference 78 equal to a difference between the TC torque 56 and the model torque 57. The error module 74 receives as input the torque difference 78, the enable flag 76, and various parameters. When the enable flag is TRUE, the error module 74 adapts the error model by incorporating the current torque difference 78 into the current error model. The structure of the error model is pre-determined from an error propagation analysis on any of such parameters that influence errors in the torque computation. Such parameters may include friction, accessory loads, and various input parameters to a torque model.

In various embodiments, a total error ($E_{total}$) can be a summation of the error from friction ($E_{fric}$), the error from accessory loads ($E_{acc}$), the error from torque model inputs ($E_{inputs}$) and known errors in the model ($E_{model}$) as shown as:

$$E_{total} = E_{fric} + E_{acc} + E_{inputs} + E_{model}. \quad (3)$$

$E_{fric}$ can be determined from a viscous error ($E_{viscous}$) determined as a function of engine speed (RPM) and fluid temperature (Temp), and a coulombic friction error ($E_{coulombic}$) determined as a function of fluid temperature (Temp). The computation can be shown as:

$$E_{fric} = E_{viscous}(\text{RPM,Temp}) + E_{coulombic}(\text{Temp}). \quad (4)$$

$E_{acc}$ is based on various electrical loads of the vehicle that impact torque such as power steering ($E_{P.S.}$) an alternator ($E_{alt}$), and accessory components ($E_{AC1}$) and ($E_{AC0}$). The computation can be shown as:

$$E_{acc} = E_{P.S.}(\text{SteeringWheelAngle}) + E_{alt}(\text{Electrical Loads}) + E_{AC1}(\text{RPM}) + E_{AC0}. \quad (5)$$

$E_{inputs}$ can be determined based on an air per cylinder error ($E_{apc}$(APC,RPM)) an exhaust gas regeneration error ($E_{egr}$(EGR)), a spark error ($E_{spk}$(Spk,RPM)) a constant error ($E_{constant}$), and any engine speed related errors (E(RPM)). The computation can be shown as:

$$E_{input} = E_{apc}(\text{APC,RPM}) + E_{egr}(\text{EGR}) + E_{spk}(\text{Spk,RPM}) + E_{constant} + E(\text{RPM}). \quad (6)$$

A simplified torque error model with lumped terms and assuming linear dominance produces:

$$E_1 = \theta_1 \text{RPM} + \theta_2 APC + \theta_3 SPK + \theta_4. \quad (7)$$

A more detailed analysis of each individual term would produce a more complex equation containing higher order terms such as:

$$E_2 = \theta_1 \text{RPM}^2 \cdot APC + \theta_2 \text{RPM} \cdot APC + \theta_3 APC + \theta_4 SPK \cdot \text{RPM} + \ldots \theta_5 * SPK + \theta_6 \text{RPM} \cdot \text{Temp} + \theta_7 \text{Temp} + \theta_8 \text{RPM} + \theta_9. \quad (8)$$

Where the theta terms ($\theta_1 \sim \theta_x$) are determined based on an adaptive strategy such as a weighted recursive least squares (WRLS) method. The estimated torque error (E) is output for use by the adapt torque module 52 of FIG. 2.

Figure 4:
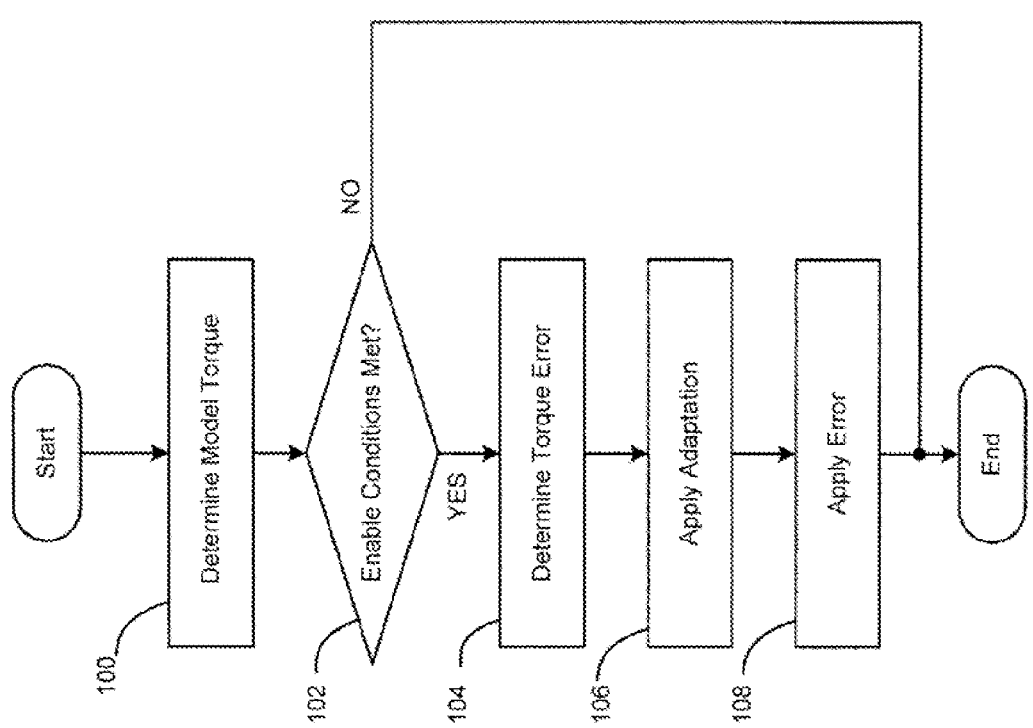
FIG. 4 is a flowchart illustrating a method for estimating torque error and adapting engine torque.

Referring now to FIG. 4, a flowchart illustrates a method of adapting engine torque. The method can be performed continually during engine operation. Control computes a TC torque based on a multi-region Kotwicki model as discussed above at 100. Control evaluates the enable conditions at 102. If the enable conditions are met at 102, a measured error is determined from a model torque and the TC torque at 104. The error model estimates a torque error and is adapted to the measured error using an adaptation method such as weighed recursive least squares at 106. The estimated torque error is then applied to the model torque at 108.

Those skilled in the art can now appreciate from the foregoing description that the broad teachings of the present disclosure can be implemented in a variety of forms. Therefore while this disclosure has been described in connection with particular examples thereof, the true scope of the disclosure should not be so limited since other modifications will become apparent to the skilled practitioner upon a study of the drawings, specification, and the following claims.

What is claimed is:

1. A torque estimation system for controlling an internal combustion engine, comprising:
    a torque model module that computes a model torque based on a mathematical torque model;
    a torque error estimator module that estimates a torque error based on an error propagation model and a plurality of torque model parameters; and
    an adapt torque module that adapts the model torque based on the torque error.

2. The system of claim 1 wherein the torque model is at least one of a regression torque model and a physical model.

3. The system of claim 1 wherein the torque error estimator module comprises:
    a torque converter torque module that computes a torque converter (TC) torque based on a torque converter model;
    a comparison module that computes a difference between the TC torque and the model torque; and
    an error module that generates the torque error based on the difference, the error propagation model, and the plurality of torque model parameters.

4. The system of claim 3 wherein the torque converter model is a multi-region Kotwicki model.

5. The system of claim 4 wherein regions of the multi-region Kotwicki model are based on slip.

6. The system of claim 1 wherein the plurality of torque model parameters are at least one of spark, engine speed, and air per cylinder.

7. The system of claim 1 wherein the plurality of torque model parameters are based on at least one of friction, engine load, and accessory load.

8. The system of claim 1 further comprising an enable module that selectively enables the torque error estimator to estimate the torque error wherein the enable module selectively enables the torque error estimation based on slip ratio and steady state conditions.

9. The system of claim 8 wherein the enable module determines slip ratio based on engine speed and turbine speed.

10. The system of claim 8 wherein the steady state conditions are determined from a derivative of a delta slip.

11. A method for estimating engine torque for use in controlling internal combustion engines, comprising:
   computing a model torque based on a mathematical model of torque;
   determining a torque error model based on an error propagation analysis of torque model parameters of the torque model, wherein the torque model parameters are based on at least one of spark, engine speed, air per cylinder, friction, engine load and accessory load;
   applying an adaptation method to the torque error model to determine a torque error; and
   computing an estimated torque based on the torque error and the model torque.

12. The method of claim 11 wherein the determining comprises determining the torque error model when enable conditions are met and wherein the enable conditions are based on slip and steady state conditions.

13. The method of claim 12 further comprising computing slip based on engine speed and turbine speed.

14. The method of claim 12 further comprising determining steady state conditions based on a derivative of a delta slip.

15. The method of claim 11 wherein the adaptation method is a weighted recursive least squares method.

16. The method of claim 11 wherein the computing an estimated torque comprises adding the torque error to the model torque.

17. The method of claim 11 wherein the mathematical model is at least one of a regression torque model and a physical model.

* * * * *